United States Patent [19]
Binversie et al.

[11] Patent Number: 5,137,480
[45] Date of Patent: Aug. 11, 1992

[54] MARINE PROPULSION DEVICE HYDRAULIC ASSEMBLY INCLUDING A BLOW MOLDED RESERVOIR

[75] Inventors: Gregory J. Binversie, Grayslake; John E. Grant, Prospect Heights, both of Ill.

[73] Assignee: Outboard Marine Corporation, Waukegan, Ill.

[21] Appl. No.: 709,599

[22] Filed: Jun. 3, 1991

[51] Int. Cl.⁵ .................................... B63H 21/26
[52] U.S. Cl. .................................................. 440/61
[58] Field of Search ............... 440/53, 61, 55, 56, 440/63, 49

[56] References Cited

U.S. PATENT DOCUMENTS

| | | | |
|---|---|---|---|
| 4,605,377 | 8/1986 | Wenstadt | 440/61 |
| 4,687,448 | 8/1987 | Peirce | 440/61 |
| 4,784,625 | 11/1988 | Nakahama | 440/61 |
| 4,824,407 | 4/1989 | Torigai et al. | 440/1 |
| 4,957,457 | 9/1990 | Probst et al. | 440/61 |
| 5,030,148 | 7/1991 | Funami et al. | 440/61 |

Primary Examiner—Jesus D. Sotelo
Assistant Examiner—Stephen P. Avila
Attorney, Agent, or Firm—Michael, Best & Friedrich

[57] ABSTRACT

A hydraulic assembly for use with a marine propulsion device including a bracket adapted to be mounted on a boat and a propulsion unit pivotally mounted on the bracket, the hydraulic assembly comprising a cylinder/piston assembly including one end adapted to be connected to the bracket, an opposite end adapted to be connected to the propulsion unit, a generally flat first mounting surface, and a passage communicating with the mounting surface, a reservoir having a wall which is formed by blow molding and which includes a tank portion defining a cavity adapted to contain hydraulic fluid, a mounting flange having thereon a generally flat second mounting surface and having therein an orifice, and a neck portion defining a passageway communicating between the cavity and the orifice, the passageway having a reduced cross-sectional area relative to the cavity and having an increased cross-sectional area relative to the orifice, a sealing element, and structure for mounting the reservoir on the cylinder/piston assembly so that the mounting surfaces are in mating engagement, so that the orifice communicates with the passage, and so that the sealing element is clamped between the mounting surfaces and surrounds the orifice and the passage.

9 Claims, 1 Drawing Sheet

U.S. Patent    Aug. 11, 1992    5,137,480
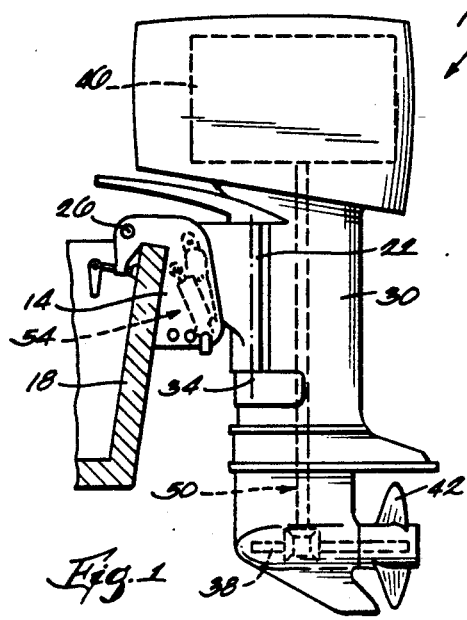
Fig. 1
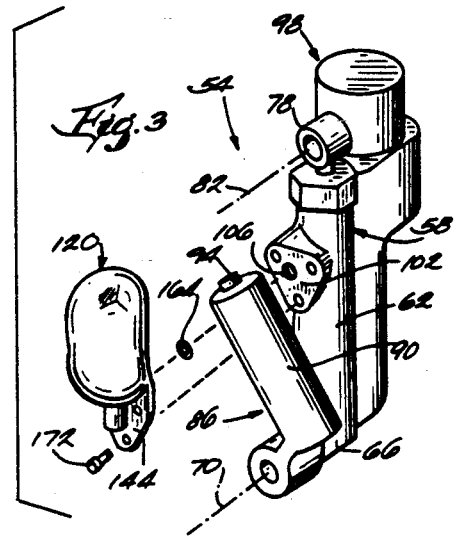
Fig. 3
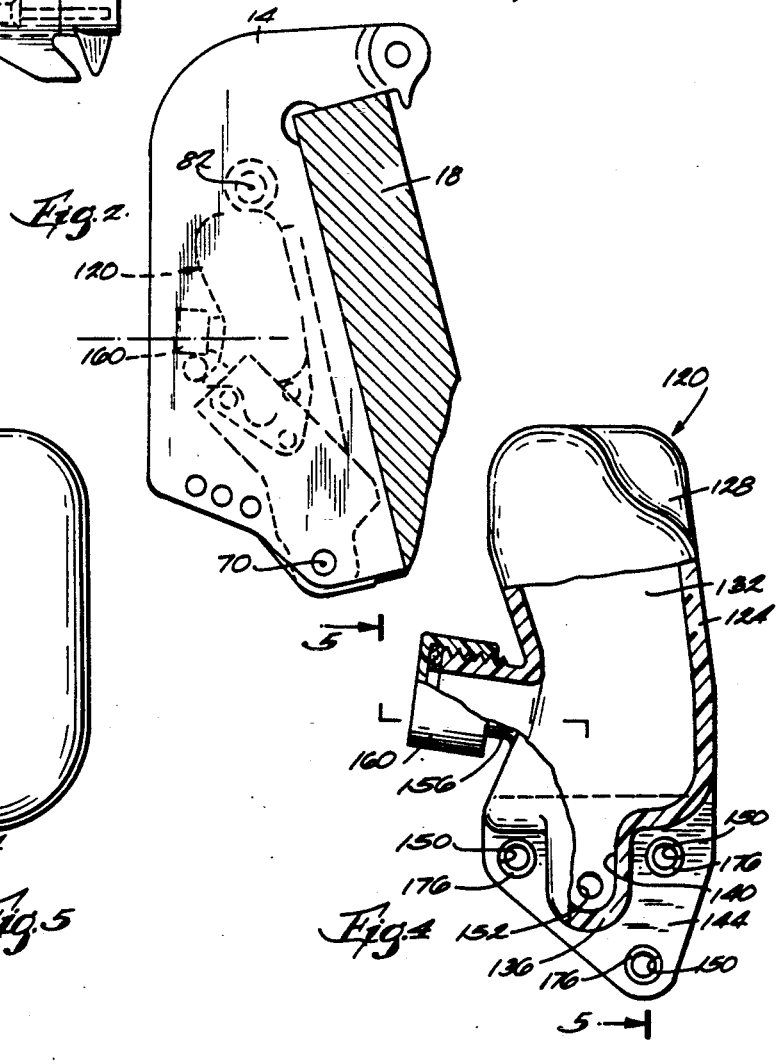
Fig. 2
Fig. 4
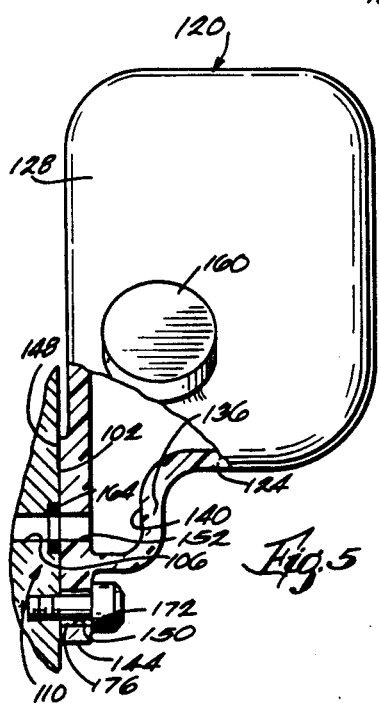
Fig. 5

MARINE PROPULSION DEVICE HYDRAULIC ASSEMBLY INCLUDING A BLOW MOLDED RESERVOIR

BACKGROUND OF THE INVENTION

1. Technical Field

The invention relates generally to marine propulsion devices and more particularly to outboard motors including hydraulic tilt and trim assemblies.

2. Related Prior Art

It is known to pivotally connect a swivel bracket to a transom bracket for pivotal movement of the swivel bracket about a horizontal tilt axis and from a lowermost running position through a trim range and a tilt range to a fully tilted or raised position. It is also known to pivotally connect a tilt cylinder/piston assembly to both the transom bracket and the swivel bracket and to employ a trim cylinder/piston assembly which is supported by the transom bracket and which includes a rearwardly extending trim piston rod that is releasably engageable with the swivel bracket for receipt of thrust therefrom during forward propulsion when in the trim range.

A known hydraulic assembly includes a hydraulic fluid reservoir defined by a downwardly opening, cup-shaped reservoir member. The reservoir member defines a generally cylindrical cavity adapted to contain hydraulic fluid, and the lower end of the reservoir member has therein a circular opening with a cross-sectional area substantially equal to the cross-sectional area of the cavity. The lower end of the reservoir member is seated on a hydraulic manifold with the opening in the lower end of the reservoir member communicating with a passage in the manifold. The reservoir member is secured to the manifold by a plurality of bolts. An O-ring surrounds the opening in the reservoir member and is clamped between the reservoir member and the manifold.

SUMMARY OF THE INVENTION

The invention provides a marine propulsion device comprising a bracket adapted to be mounted on a boat, a propulsion unit mounted on the bracket for pivotal movement relative thereto, a cylinder/piston assembly including one end connected to the bracket, and an opposite end connected to the propulsion unit, and means defining a fluid passage, a reservoir having a wall formed by blow molding to define therein an enclosed cavity, and means for mounting the reservoir on the cylinder/piston assembly so that the cavity communicates with the passage.

One embodiment of the invention provides a marine propulsion device comprising a bracket adapted to be mounted on a boat, a propulsion unit mounted on the bracket for pivotal movement relative thereto, and a cylinder/piston assembly including one end connected to the bracket, an opposite end connected to the propulsion unit, and means defining a fluid passage, a reservoir including a tank portion defining a cavity adapted to contain hydraulic fluid, and a neck portion defining a passageway communicating with the cavity and having a reduced cross-sectional area relative to the cavity, and means for mounting the reservoir on the cylinder/piston assembly so that the neck portion communicates with the passage.

One embodiment of the invention provides a marine propulsion device comprising a bracket adapted to be mounted on a boat, a propulsion unit mounted on the bracket for pivotal movement relative thereto, a cylinder/piston assembly including one end connected to the bracket, an opposite end connected to the propulsion unit, a generally flat first mounting surface, and a passage communicating with the first mounting surface, a reservoir including a mounting flange having a generally flat second mounting surface and having therethrough an orifice, and a tank portion which is integrally formed with the mounting flange and which defines a cavity communicating with the orifice, and means for mounting the reservoir on the cylinder/piston assembly so that the second mounting surface is in mating engagement with the first mounting surface and so that the orifice communicates with the passage. 13. A marine propulsion device as set forth in claim 12 wherein the reservoir is made by blow molding.

One embodiment of the invention provides a hydraulic assembly for use with a marine propulsion device including a bracket adapted to be mounted on a boat and a propulsion unit pivotally mounted on the bracket, the hydraulic assembly comprising a cylinder/piston assembly including one end adapted to be connected to the bracket, an opposite end adapted to be connected to the propulsion unit, a generally flat first mounting surface, and a passage communicating with the mounting surface, a reservoir having a wall which is formed by blow molding and which includes a tank portion defining a cavity adapted to contain hydraulic fluid, a mounting flange having thereon a generally flat second mounting surface and having therein an orifice, and a neck portion defining a passageway communicating between the cavity and the orifice, the passageway having a reduced cross-sectional area relative to the cavity and having an increased cross-sectional area relative to the orifice, a sealing element, and means for mounting the reservoir on the cylinder/piston assembly so that the mounting surfaces are in mating engagement, so that the orifice communicates with the passage, and so that the sealing element is clamped between the mounting surfaces and surrounds the orifice and the passage.

A principal feature of the invention is the provision of a blow molded hydraulic reservoir. The blow molding process allows formation of an integral or one-piece reservoir defining a cavity and having therein an opening which communicates with the cavity and which has a cross-sectional area substantially less than the cross-sectional area of the cavity. This permits the use of a much smaller O-ring or seal than is required by known prior art constructions.

Other features and advantages of the invention will become apparent to those of ordinary skill in the art upon review of the following detailed description, claims, and drawings.

DESCRIPTION OF THE DRAWINGS

FIG. 1 is a side elevational view of a marine propulsion device incorporating various of the features of the invention.

FIG. 2 is an enlarged view of a portion of the marine propulsion device illustrated in FIG. 1.

FIG. 3 is an exploded perspective view of the hydraulic tilt/trim assembly illustrated in FIG. 2.

FIG. 4 is a side elevational view, partially in section, of the reservoir illustrated in FIG. 3.

FIG. 5 is a cross-sectional view taken along line 5—5 in FIG. 4.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Shown in FIG. 1 is a marine propulsion device which is in the form of an outboard motor 10. The outboard motor 10 includes a transom bracket 14 fixedly mounted to the transom 18 of a boat, and a swivel bracket 22 pivotally mounted on the transom bracket 14 for pivotal movement relative thereto about a horizontal tilt axis 26. The swivel bracket 22 is pivotable from a lowermost running position to a fully raised, upper position (not shown), i.e. through a trim range and a tilt range.

The outboard motor 10 also includes a propulsion unit 30 connected to the swivel bracket 22 for common movement therewith about the tilt axis 26 and for pivotal movement relative to the swivel bracket 22 about a generally vertical steering axis 34. The propulsion unit 30 includes a propeller shaft 38 having thereon a propeller 42, and an engine 46 drivingly connected to the propeller shaft 38 by a conventional drive train 50.

Hydraulic means are provided for pivoting the swivel bracket 22 and connected propulsion unit 30 about the horizontal tilt axis 26 and relative to the transom bracket 14. While other constructions can be employed, in the illustrated construction, such means comprises a hydraulic tilt and trim assembly 54. In the disclosed construction, the hydraulic tilt and trim assembly 54 includes (see FIG. 3) a hydraulic tilt cylinder/piston assembly 58 including a tilt cylinder 62 having a lower, blind end 66 pivotally connected to the transom bracket 14 about a first or lower horizontal axis 70, a piston (not shown) slidably housed by the cylinder 62, and a piston rod 78 which extends from the other end of the tilt cylinder 62 and which has one end fixed to the piston and another end pivotally connected to the swivel bracket 22 about a second or upper horizontal axis 82. The tilt cylinder/piston assembly 58 extends generally vertically at all times throughout tilting movement of the swivel bracket 22 and connected propulsion unit 30 in the trim and tilt ranges, notwithstanding that the hydraulic tilt and trim assembly 54 pivots somewhat about the lower horizontal axis 70 in response to tilting movement of the swivel bracket 22.

The hydraulic tilt and trim assembly 54 also includes (see FIG. 3) at least one hydraulic trim cylinder/piston assembly 86 fixed to the tilt cylinder 62 on the side thereof. The trim assembly 86 includes a trim cylinder 90 having a blind or closed end fixed to the tilt cylinder 62, and an open rearward or outer end. Extending from the trim cylinder 90 is a trim piston rod 94 having an outer end which engages the swivel bracket 22 for forward thrust transmission when the swivel bracket 22 is in the trim range. Because the trim cylinder 90 is fixed to the tilt cylinder 62, the trim cylinder/piston assembly 86 is pivotable about the lower horizontal axis 70 in common with the tilt cylinder 62. Unlike the tilt piston rod 78, however, the trim piston rod 94 is free of fixed connection with the swivel bracket 22 and, in fact, during swivel bracket movement through the tilt range, the outer end of the trim piston rod 94 is spaced from the swivel bracket 22.

The hydraulic assembly 54 also includes means for supplying hydraulic fluid to the tilt and trim cylinders 62 and 90 to effect movement of the tilt and trim piston rods 78 and 94. While other constructions could be employed, in the disclosed construction, the hydraulic tilt and trim assembly 54 includes (see FIG. 3) a reversible electric motor and pump sub-assembly 98 which is fixedly connected to the tilt cylinder 62 and which is hydraulically connected to the tilt cylinder 62 and to the trim cylinder 90. While various features of the tilt and trim assembly 54 have been described, a suitable construction for the tilt and trim assembly 54 as thus far described is disclosed in U.S. patent application Ser. No. 523,321, which was filed May 14, 1990 and is now U.S. Pat. No. 5,049,098 issued on Sep. 17, 1991 and which is incorporated herein by reference.

In the illustrated embodiment of the invention, the tilt cylinder/piston assembly 58 also includes (see FIGS. 3 and 5) a vertically extending, generally flat mounting surface 102, and a passage 106 communicating between the surface 102 and the pump. The passage 106 communicates with the trim and tilt cylinders 62 and 90 via the pump. As shown in FIG. 5, the mounting surface 102 has therein a circular recess or counterbore 110 surrounding the passage 106. The reason for the recess 110 is explained below.

The hydraulic assembly 54 also includes (see FIGS. 2–5) a hydraulic fluid reservoir or reservoir component 120 communicating with the passage 106. The reservoir 120 includes (see FIGS. 4 and 5) an integral or one-piece wall 124 formed by blow molding. The wall 124 includes a tank portion 128 defining a cavity 132 adapted to contain hydraulic fluid. The wall 124 also includes a constricted neck portion 136 defining a passageway 140. The passageway 140 communicates with the cavity 132 and has a substantially reduced cross-sectional area relative to the cavity 132. The wall 124 also includes a mounting flange 144 having thereon (see FIG. 5) a generally flat mounting surface 148. The mounting flange 144 has therethrough a plurality of bores 150 and has therein an orifice or duct 152. The orifice 152 communicates with the mounting surface 148 and with the passageway 140, and the orifice 152 has a substantially reduced cross-sectional area relative to the passageway 140. Thus, the passageway 140 communicates between the cavity 132 and the orifice 152, has a reduced cross-sectional area relative to the cavity 132, and has an increased cross-sectional area relative to the orifice 152. The wall 124 also includes (see FIG. 4) an externally threaded, outwardly projecting nozzle or spout 156 through which hydraulic fluid can be introduced into the reservoir 120. A cap 160 is removably threaded onto the nozzle 156 to close the reservoir 120.

As mentioned above, the reservoir 120 is formed in a blow molding process. The reservoir wall 124 is initially molded without the bores 150 and the orifice 152, and the wall 124 is formed by blowing plastic into a mold at the point corresponding to the end of the nozzle 156. Thereafter, the wall 124 is drilled to form the orifice 152 and the bores 150, the mounting flange 144 is machined so that the mounting surface 148 is substantially flat, and the end of the nozzle 156 is cut to its final configuration.

The hydraulic assembly 54 also includes (see FIGS. 3 and 5) a sealing element or O-ring 164 located in the counterbore 110 so that the sealing element 164 surrounds the passage 106. The hydraulic assembly 54 further includes means for mounting the reservoir 120 on the tilt cylinder/piston assembly 58 so that the mounting surfaces 102 and 148 are in mating engagement and so that the sealing element 164 is clamped between the mounting surfaces 102 and 148 and surrounds both the passage 106 and the orifice 152. While various suitable mounting means can be employed, in the illustrated construction, the mounting means includes respective screws 172 extending through the mounting flange bores 150 and into the cylinder/piston assembly 58. Preferably, each bore 150 has therein (see FIGS. 4 and 5) a metal bushing 176 surrounding the associated screw 172.

The nozzle 156 is accessible when the propulsion unit 30 is in its raised position, and the nozzle 156 preferably extends slightly upwardly when the propulsion unit 30 is in its raised position so as to facilitate filling of the reservoir 120. Furthermore, the nozzle 156 is located such that hydraulic fluid pours out of the nozzle 156 when the reservoir 120 is properly filled. (The reservoir 120 should not be completely filled when the propulsion unit 30 is in its raised position, because the reservoir 120 must contain more fluid when the propulsion unit 30 is in its running position.)

Various features of the invention are set forth in the following claims.

We claim:

1. A marine propulsion device comprising a bracket adapted to be mounted on a boat, a propulsion unit mounted on said bracket for pivotal movement relative thereto, a cylinder/piston assembly including one end connected to said bracket, an opposite end connected to said propulsion unit, a generally flat first mounting surface, and a passage communicating with said first mounting surface, a reservoir including a generally flat second mounting surface, an orifice communicating with said second mounting surface, and a tank portion which defines a cavity communicating with said orifice and having a substantially increased cross-sectional area relative to said orifice, a sealing element, and means for mounting said reservoir on said cylinder/piston assembly so that said mounting surfaces are in mating engagement, so that said orifice communicates with said passage, and so that said sealing element is clamped between said mounting surfaces and surrounds said orifice and said passage.

2. A marine propulsion device as set forth in claim 1 wherein said reservoir also includes a mounting flange which is integral with said tank portion, which has thereon said second mounting surface, and which has therein said orifice.

3. A marine propulsion device as set forth in claim 2 wherein said reservoir also includes a neck portion defining a passageway communicating between said cavity and said orifice, said passageway having a reduced cross-sectional area relative to said cavity and having an increased cross-sectional area relative to said orifice.

4. A marine propulsion device as set forth in claim 3 wherein said neck portion and said mounting flange support said tank portion relative to said cylinder/piston assembly.

5. A marine propulsion device comprising a transom bracket adapted to be mounted on a boat, a swivel bracket connected to said transom bracket for tilting movement relative thereto, a propulsion unit mounted on said swivel bracket for steering movement relative thereto, a cylinder/piston assembly including one end connected to said transom bracket, an opposite end connected to said swivel bracket, a generally flat first mounting surface, and means defining a fluid passage communicating with said first mounting surface, a reservoir component comprising a one-piece wall defining an enclosed reservoir cavity, a mounting portion having a generally flat second mounting surface, and a duct communicating between said reservoir cavity and said second mounting surface, and means for mounting said reservoir component on said cylinder/piston assembly with said second mounting surface secured to said first mounting surface and with said duct in communication with said fluid passage.

6. A marine propulsion device as set forth in claim 5 and further comprising a sealing element which is clamped between said mounting surfaces and which surrounds said orifice.

7. A marine propulsion device as set forth in claim 5 wherein said wall includes a tank portion defining said cavity and a constricted neck portion defining a passageway communicating between said cavity and said passage.

8. A marine propulsion device as set forth in claim 7 wherein said neck portion and said mounting flange support said tank portion relative to said cylinder/piston assembly.

9. A hydraulic assembly for use with a marine propulsion device including a bracket adapted to be mounted on a boat and a propulsion unit pivotally mounted on the bracket, said hydraulic assembly comprising a cylinder/piston assembly including one end adapted to be connected to the bracket, an opposite end adapted to be connected to the propulsion unit, a generally flat first mounting surface, and a passage communicating with said mounting surface, a reservoir having a one-piece wall which includes a tank portion defining a cavity adapted to contain hydraulic fluid, a mounting flange having thereon a generally flat second mounting surface and having therein an orifice, and a neck portion defining a passageway communicating between said cavity and said orifice, said passageway having a reduced cross-sectional area relative to said cavity and having an increased cross-sectional area relative to said orifice, a sealing element, and means for mounting said reservoir on said cylinder/piston assembly so that said mounting surfaces are in mating engagement, so that said orifice communicates with said passage, and so that said sealing element is clamped between said mounting surfaces and surrounds said orifice and said passage.

* * * * *

UNITED STATES PATENT AND TRADEMARK OFFICE
CERTIFICATE OF CORRECTION

PATENT NO. : 5,137,480
DATED : August 11, 1992
INVENTOR(S) : Gregory J. Binversie, et. al.

It is certified that error appears in the above-indentified patent and that said Letters Patent is hereby corrected as shown below:

Title page, item [73], Assignee: should read-- Outboard Marine Corporation, Waukegan, IL and Showa american, Inc., Itasca, IL--.

Signed and Sealed this

Second Day of July, 1996

*Attest:*

BRUCE LEHMAN

*Attesting Officer*      Commissioner of Patents and Trademarks